W. S. PEDLAR.
LAWN MOWER.
APPLICATION FILED JULY 16, 1913.
1,225,050.
Patented May 8, 1917.
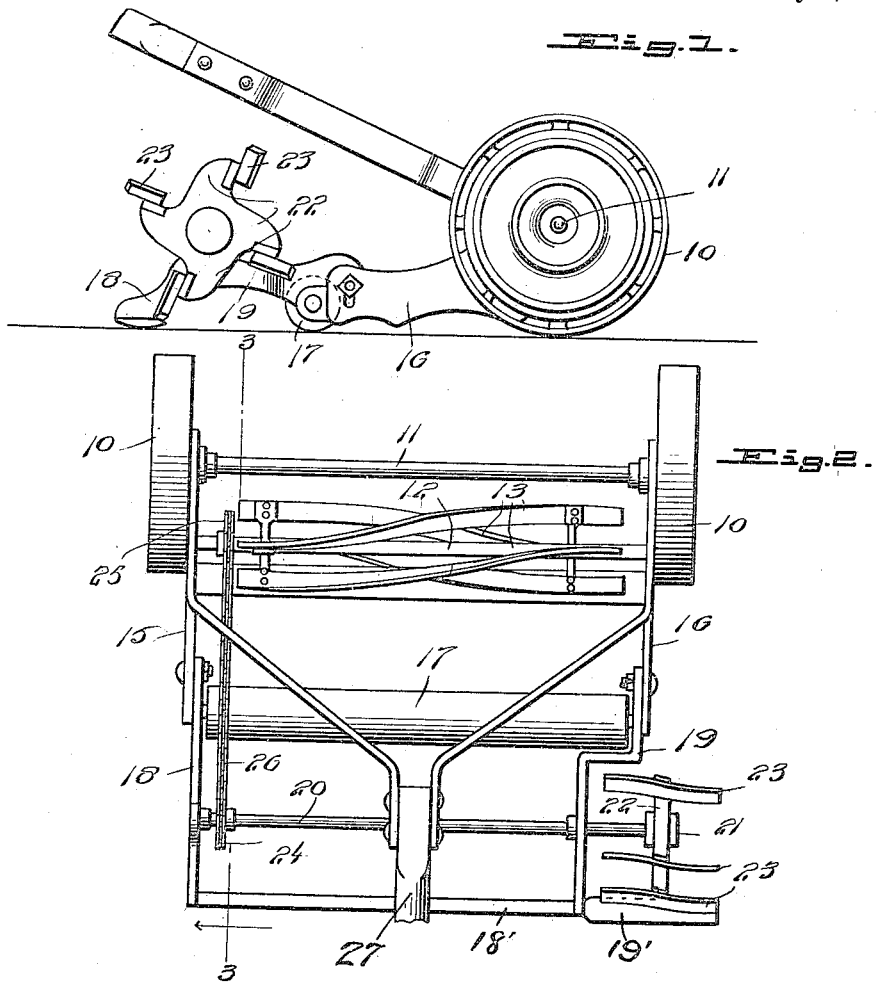
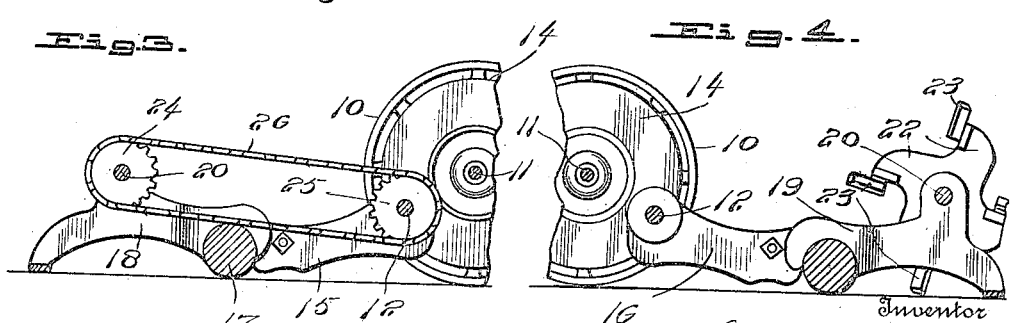

UNITED STATES PATENT OFFICE.

WILLIAM S. PEDLAR, OF VANCOUVER, BRITISH COLUMBIA, CANADA.

LAWN-MOWER.

1,225,050.
Specification of Letters Patent.
Patented May 8, 1917.

Application filed July 16, 1913. Serial No. 779,309.

*To all whom it may concern:*

Be it known that I, WILLIAM S. PEDLAR, a subject of the King of Great Britain, residing at Vancouver, in the Province of British Columbia, Dominion of Canada, have invented certain new and useful Improvements in Lawn-Mowers; and I do hereby declare the following to be a full, clear, and exact description of the invention, such as will enable others skilled in the art to which it appertains to make and use the same.

This invention relates to lawn mowers.

In the use of lawn mowers of the usual type it is found difficult to trim grass close to a walk or a flower bed, a portion of the grass adjacent the walk or the flower bed being left uncut so as to render the manual shearing of same necessary. It is therefore the object of the present invention to provide a lawn mower which may be operated to efficiently trim grass adjacent the edge of a walk or a flower bed and thereby obviate the necessity of manually shearing the grass located at such points.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side elevation of a lawn mower constructed in accordance with the invention;

Fig. 2, a plan view thereof;

Fig. 3, a section on the line 3—3 of Fig. 2, and

Fig. 4, a section similar to Fig. 3 looking in the opposite direction.

Referring to the drawings 10 indicates the main traction wheels upon which the machine is substantially supported, 11 the main axle of the mower and 12 the knife shaft upon which are mounted the usual knives 13 in the well known manner, the rotation of the shaft 12 and knives 13 being effected through the medium of a system of gears inclosed in casings 14 mounted on each end of the axle 11 and disposed within respective traction wheels 10 all in the usual and well known manner, said gears being not shown in this instance as they constitute no part of the invention. Extending rearwardly from the casings 14 are corresponding brackets 15 and 16 respectively between which is journaled the usual ground roller 17. Secured to and extending rearwardly from the bracket 15 is a plate 18, while a plate 19 is secured and extends rearwardly from the bracket 16. The plate 19 has its rear end offset inwardly and journaled in the plate 18 and the offset inner end of the plate 19 is a supplemental knife shaft 20. Fixed on the shaft 20 adjacent the outer side of the offset inner end of the plate 19 is a knife hub 21 provided with a plurality of arms 22 upon each of which is mounted a supplemental knife 23. The rear ends of the plates 18 and 19 are connected by a bar 18' and one end of this bar is extended outwardly of the plate 19 to form a stationary knife 19' adapted for coöperation with the knives 23 as will be obvious. Owing to the fact that the end of the plate 19 is offset inwardly the inner ends of the knives 23 are disposed in overlapping relation to the adjacent ends of the knives 13, while the outer ends of the knives 23 project a considerable distance beyond the outer side of the adjacent traction wheel 10. Fixed on the supplemental knife shaft 20 adjacent the plate 18 is a sprocket wheel 24 which alines with a sprocket wheel 25 fixed on the knife shaft 12 and traveling on these sprocket wheels 24 and 25 is a sprocket chain 26.

The machine is adapted to be moved along the ground through the medium of the usual handle 27 and in the operation of the device it will be apparent that the rotation of the main knife shaft 12 will be transmitted to the supplemental knife shaft 20 through the medium of the sprocket wheels 25, 24 and sprocket chain 26 so that the knives 23 will be rotated simultaneously with the knives 13. Owing to the position of the knives 23 with respect to the knives 13 and the adjacent traction wheel 10 it will be apparent that the knives 23 will efficiently cut grass along the edge of a walk or flower bed although the nearest traction wheel of the mower is disposed some distance from such edge.

What is claimed is:—

In a lawn mower the combination of a wheeled body including a rotatable knife shaft, and traction operated means for rotating said knife shaft, knives carried by the shaft, arms adjustably secured to opposite sides of the wheeled body, a supplemental knife shaft journaled in said arms, sprocket wheels fixed on the first named knife shaft and the supplemental knife shaft, a sprocket chain traveling on said sprocket wheels, and knives mounted on the supplemental knife shaft having their outer ends disposed beyond the adjacent side of the body and their inner ends disposed inwardly of the adjacent ends of the knives mounted on the first named knife shaft.

In testimony wherof, I affix my signature, in the presence of two witnesses.

WILLIAM S. PEDLAR.

Witnesses:
PEARL MACGILLIVRAY,
J. C. YUILL.

Copies of this patent may be obtained for five cents each, by addressing the "Commissioner of Patents, Washington, D. C."